Patented Jan. 29, 1952

2,583,984

UNITED STATES PATENT OFFICE 2,583,984

PRODUCTION OF NITRILES

Paul Arthur, Jr., Wilmington, Del., assignor to E. I. du Pont de Nemours and Company, Wilmington, Del., a corporation of Delaware No Drawing. Application August 30, 1950, Serial No. 182,411

7 Claims. (Cl. 260—465.3)

This invention relates to the production of nitriles and, more particularly, it relates to the production of nitrile derivatives of 1,3-butadiene.

It has been proposed, heretofore, to react 1,3-butadiene with hydrogen cyanide in the presence of various catalysts. Some of these processes are described, for example, in U. S. Patents Nos. 2,402,873, 2,422,859, 2,447,600, and 2,464,723. All of these previously-known processes require the use of the highly volatile, toxic hydrogen cyanide and are therefore objectionable.

It is an object of this invention to cyanate 1,3-butadiene without the use of hydrogen cyanide.

It is another object of this invention to provide a process for the cyanation of 1,3-butadiene in which materials other than hydrogen cyanide are used as the cyanating agents.

Other objects of the invention will appear hereinafter.

The objects of this invention may be accomplished by subjecting a mixture of 1,3-butadiene, cuprous cyanide, a ferric halide taken from the group consisting of ferric chloride and ferric bromide, and an aromatic hydrocarbon that is liquid at reaction temperature, to a temperature above about 75° C.

It has now been discovered that when a mixture of 1,3-butadiene, cuprous cyanide, ferric halide, and a liquid aromatic hydrocarbon are subjected to a temperature above about 75° C., reaction between these materials takes place to produce a number of nitrile derivatives of 1,3-butadiene, including 3-pentenenitrile, 4-pentenenitrile, and 1,4-dicyano-2-butene.

On the basis of available evidence, it is believed that the reaction proceeds through a free radical mechanism whereby cyanide free radicals are formed and interact with the butadiene and the aromatic hydrocarbon, the latter acting as a hydrogen donor. The following set of equations are believed to represent the transformations which take place when the above-mentioned mixture of substances is subjected to a reaction temperature of above about 75° C. The present invention is not to be limited in any way to these equations. In the following equations, the aromatic hydrocarbon is represented by RH, the cyanide free radical by CN·; and the 1,3-butadiene by its impirical formula $C_4H_6$.

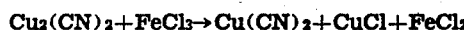
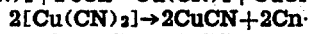

Support is given to the transformations as represented by the above equations by the fact that 4-pentenenitrile and 1,4-dicyano-2-butene, the two nitriles indicated on the right-hand side of the last equation above, have been isolated from a reaction product of the above-designated mixture. Neither of these two nitriles is found in the product of hydrocyanation of 1,3-butadiene by previously published methods such as those of the U. S. patents referred to above.

In the process of this invention, it is preferred that the cuprous cyanide and the ferric halide be used in substantially equimolar quantities, although a moderate excess of one or the other, e. g., about 50% excess, does no harm. Either ferric chloride or ferric bromide can be used, but ferric chloride gives better results and is cheaper. It is desirable that the ferric halide be used in its hydrated form, that is, as $FeCl_3·6H_2O$ or $FeBr_3·6H_2O$, since the anhydrous salt tends to give polymeric rather than monomeric nitriles. However, it is possible to use less water than the quantity required for the hexahydrate, e. g., from 25% to 50% water by weight of ferric halide.

In accordance with the reaction mechanism outlined above, it is desirable that the 1,3-butadiene be used in proportions of at least one-eighth mole per mole of combined cuprous cyanide and ferric halide. Preferably, however, it is used in excess, e. g., up to two moles per mole of combined cuprous cyanide and ferric halide.

As the reaction medium and hydrogen donor, any aromatic hydrocarbon which is liquid at the reaction temperature can be used. For reasons of convenience and economy, it is preferred to use an aromatic hydrocarbon of six to ten carbon atoms, e. g., benzene, toluene, the xylenes, naphthalene, and the like. It is desirable to use at least one-eighth mole of aromatic hydrocarbon per mole of combined cuprous cyanide and ferric halide and preferably it is used in excess, e. g., in an amount of from one to three moles per mole of combined cuprous cyanide and ferric halide. It is possible, although less satisfactory, to use other hydrogen donor solvents such as isopropyl alcohol.

At temperatures of 50° C. or below, the reaction proceeds too slowly to be practical. In practice, a reaction temperature of at least 75° C. is desirable. The upper limit of temperature is dictated only by the decomposition point of the reactants but in practice there is no reason for exceeding about 200° C. The formation of 1,4-dicyano-2-butene decreases at temperatures near 160° C., although that of the mononitriles does not appear to be affected. The most useful range of reaction temperatures is between 80° C. and 160° C. Since 1,3-butadiene is volatile, it is necessary to operate in closed, pressure-resistant vessels. The reaction proceeds at the autogenous pressure of the reactants and no additional pressure is necessary, although such may be used if desired.

The reaction time is not very critical. Sufficient product to permit isolation is formed shortly after the start of the reaction at the preferred temperature range. In general, a reaction period of three to ten hours is preferred for best results.

The products may be isolated by any desired method. Generally, it is preferred to filter off the inorganic material in suspension in the mixture and fractionate the liquid. The mononitriles are liquid products, and 1,4-dicyano-2-butene is a solid, melting at 75°–77° C., which can be distilled under reduced pressure.

The invention is illustrated in greater detail in the following examples in which parts are by weight unless otherwise noted.

Example I

A mixture of 29.5 parts of cuprous cyanide (CuCN, ⅓ mole), 90.1 parts of ferric chloride hydrate ($FeCl_3 \cdot 6H_2O$, ⅓ mole), 36 parts of 1,3-butadiene (⅔ mole) and 130 parts of benzene was charged into a stainless-steel bomb cooled in a solid carbon dioxide-acetone mixture. The bomb was pressure tested to 300 lb./sq. in. with nitrogen and vented to atmospheric pressure. After being charged with the above substances it was closed, brought to a temperature of 100° C., where it was maintained for one hour, then to 120° C., where it was maintained for four hours. The bomb was then cooled, vented, and opened. The reaction mixture was filtered to separate the liquid from the solids. The latter contained some metallic copper. Fractionation of the clear, amber-colored benzene solution gave, after removal of the excess butadiene and benzene, an intermediate fraction boiling from 85° C. at 760 mm. to 60° C. at 100 mm.; then a pentenenitrile fraction boiling at 60°–84° C. at 100 mm.; and a fraction boiling at 150°–170° C. at 30 mm. The pentenenitriles were obtained in yield of 39% based on the equations indicated above. The mixture in the pentenenitrile fraction, as shown by infrared spectography, consisted chiefly of 3-pentenenitrile, $NC-CH_2-CH=CH-CH_3$, and 4-pentene-nitrile, $NC-CH_2-CH_2-CH=CH_2$, the latter being present in an amount of about 10% of the total. The higher boiling fraction upon cooling gave crystals of 1,4-dicyano-2-butene, M. P. 73°–74° C., which upon being mixed with an authentic sample (M. P. 75°–77° C.) gave a mixture melting at 75°–77° C. The 1,4-dicyano-2-butene produced and isolated contained 26.2% nitrogen as compared with its calculated value of 26.4%. The mother liquor from the separation of the solid 1,4-dicyano-2-butene contained about 10% nitrogen.

Example II

The experiment of Example I was repeated except that the temperature was 160° C. throughout the reaction period of five hours. There was obtained a 32% yield of a mixture of pentenenitrile containing somewhat less than 5% of 4-pentenenitrile, the remainder being 3-pentenenitrile. The reaction product also contained small amounts of nitrogen-containing material boiling in the range of 94° C. at 100 mm. pressure to 156° C. at 0.7 mm. pressure.

Example III

Using the procedure of Example I, cuprous cyanide, ferric chloride hydrate, 1,3-butadiene, and benzene were reacted in the molar ratio of 2/2/1/2.5. There was obtained a 3-pentenenitrile fraction containing no 4-pentenenitrile, as shown by infrared spectograms, and a small amount of nitrogen-containing products boiling in the range of 60°–140° C. at 10 mm. pressure.

Example IV

The experiment of Example I was repeated, using ferric bromide hydrate instead of ferric chloride hydrate. The reaction product consisted essentially of 3-pentenenitrile.

The mononitriles obtained by the process of this invention are useful as chemical intermediates in the synthesis of acids, amines, amides, etc., and they are also useful, per se, as insecticides, fumigants, solvents, etc. 1,4-dicyano-2-butene is a highly important industrial chemical, especially useful in the manufacture of hexamethylenediamine and also for the prepartion of many other chemicals.

Since it is obvious that many changes and modifications can be made in the above-described details without departing from the nature and spirit of the invention, it is to be understood that the invention is not to be limited to said details except as set forth in the appended claims.

I claim:

1. A process for the production of nitriles which comprises subjecting a mixture of 1,3-butadiene, cuprous cyanide, a ferric halide taken from the group consisting of ferric chloride and ferric bromide, a sufficient quantity of water to form at least some hexahydrate with the ferric halide and an aromatic hydrocarbon that is liquid at reaction temperature to a temperature above about 75° C.

2. A process for the production of nitriles which comprises subjecting a mixture of 1,3-butadiene, cuprous cyanide, a ferric halide taken from the group consisting of ferric chloride and ferric bromide, a sufficient quantity of water to form at least some hexahydrate with the ferric halide and an aromatic hydrocarbon that is liquid at reaction temperature above about 75° C., said cuprous chloride and ferric halide being present in said mixture in a molar ratio of between 1:1.5 and 1.5:1, said butadiene being present in an amount between ⅛ mole and two moles, and said aromatic hydrocarbon between ⅛ mole and 3 moles, per mole of combined cuprous cyanide and ferric halide present.

3. A process for the production of nitriles which comprises subjecting a mixture of 1,3-butadiene, cuprous cyanide, a ferric halide taken from the group consisting of ferric chloride and ferric bromide, a sufficient quantity of water to form at least some hexahydrate with the ferric halide and an aromatic hydrocarbon that is liquid at reaction temperature to a temperature above 75° C. for a period of three to ten hours.

4. The process of claim 1 in which the ferric halide is present as ferric halide hexahydrate.

5. The process of claim 1 in which the aromatic hydrocarbon is benzene.

6. The process of claim 1 in which the ferric halide is present as ferric chloride and ferric chloride hexahydrate.

7. The process of claim 1 in which the ferric halide is present as ferric chloride hexahydrate.

PAUL ARTHUR, JR.

REFERENCES CITED

The following references are of record in the file of this patent:

UNITED STATES PATENTS

| Number | Name | Date |
|---|---|---|
| 2,402,873 | Coffman et al. | June 25, 1946 |

OTHER REFERENCES

Adams et al., "Org. Reactions" (Wiley), vol. III, page 3 (1947).